United States Patent Office.

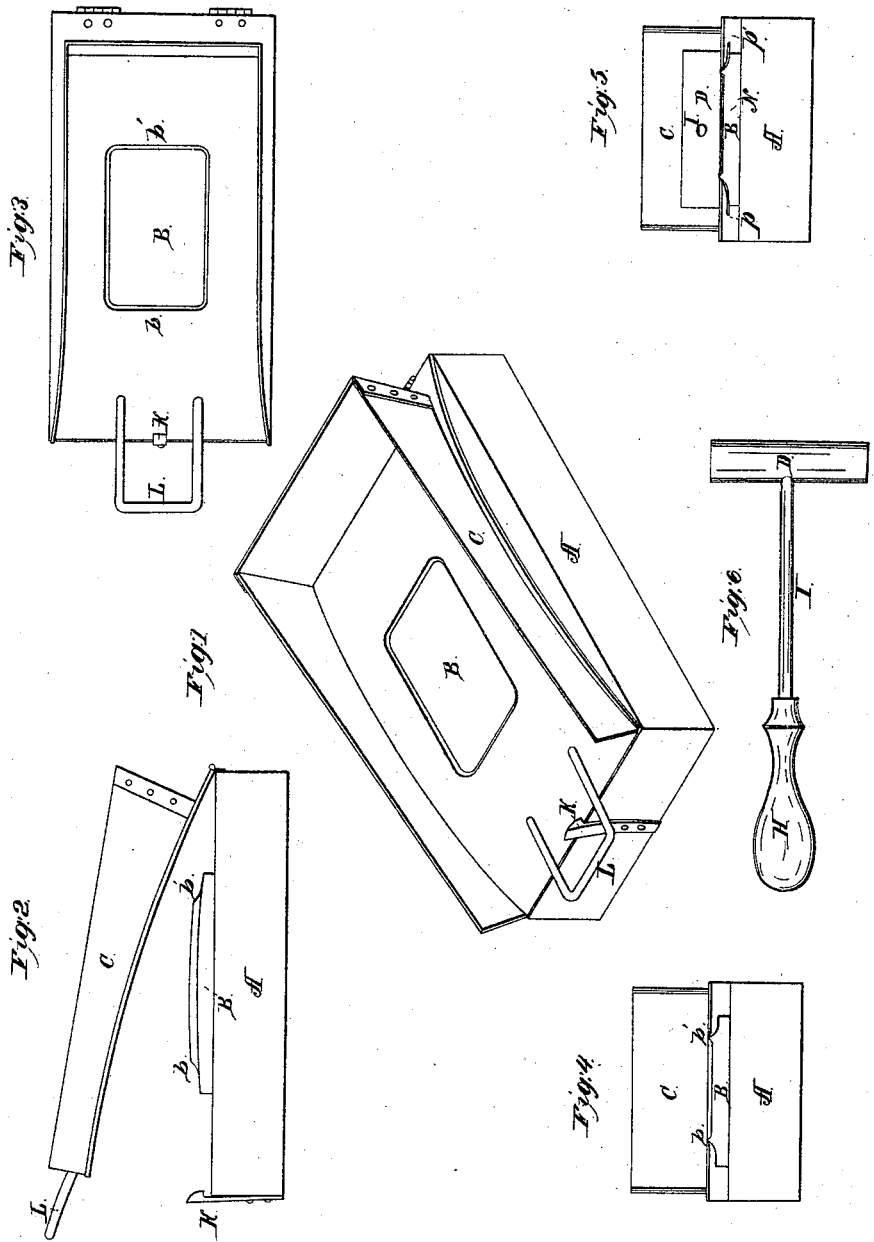

ALBERT D. RICHARDS, OF LOWELL, MASSACHUSETTS.

Letters Patent No. 63,814, dated April 16, 1867.

---

IMPROVED APPARATUS FOR MAKING MEDICAL PLASTERS.

---

The Schedule referred to in these Letters Patent and making part of the same.

---

Be it known that I, ALBERT D. RICHARDS, of Lowell, in the county of Middlesex, and State of Massachusetts, have invented an improved Machine for Making Medical Plasters; and I do hereby declare that the following is a full and exact description thereof, reference being had to the accompanying drawings, and to the letters of reference marked thereon.

My invention consists in the improved construction of a machine for spreading medical plasters.

To enable others skilled in the art to make and use my invention, I will proceed to describe its construction and use.

Figure 1 is an isometrical view of the machine with the pan or shield part down.

Figure 2 is an elevation of the same, with the pan or shield C raised.

Figure 3 is a plan of the same.

Figure 4 is a cross-section of the same.

Figure 5 is a cross-section of the instrument as it would appear when in operation.

Figure 6 represents an instrument to be used in connection with my machine, the use of which will be explained.

I make of wood a block or base, A. Upon this block I affix a bed-piece, B. The upper surface of this bed-piece is concave, as shown in section, figs. 4 and 5. This concavity is bounded on all sides by a sharp edge, $b\ b'$, figs. 3 and 4. Hinged to one end of the block A is the shield or pan C. The pan C has an opening, B, fig. 1. The posts of the bottom of the pan, which form the edges of the opening B, are bevelled or chamfered off on their under side, as shown in figs. 4 and 5, so that when the pan is down it forms a close-fitting joint, with the sharp raised edges $b\ b'$ of the bed-piece B as shown in fig. 4. K is a spring-latch, made fast to the block A, which serves to keep the pan C down upon the bed-piece B or upon the material on which the plaster is to be spread. L is a handle, attached to the pan C. Fig. 6 represents a spreader to be used in connection with my machine, consisting of a heavy metallic rod, D, attached by a strong rod, I, to a handle, H, all as shown.

To use my plaster-spreading machine I proceed as follows: Raise up the pan C, as shown in fig. 2; place upon the bed-piece B the cloth or leather $p\ p'$, fig. 5, upon which the plaster is to be spread, and bring down and make fast by means of the latch K the pan C. Now, having a quantity of the plaster-wax in the pan C, take the spreader, fig. 6, and, having the part D quite warm, proceed to draw the plaster-wax over the cloth or leather which is exposed in the opening B. When the whole exposed surface is covered unlatch the pan and raise it. The finished plaster will now be found lying upon the bed-piece B, as shown at fig. 5. An inspection of fig. 5 will show that the plaster will be thin at the edges, from the fact that there the surface of the leather upon which it is spread comes up even with the surface of the pan.

My invention consists essentially in forming the bed-piece B with the sunk panel or concavity upon its upper surface, as shown in fig. 4, and in chamfering the edges of the opening in the bottom of the pan C.

*Claim.*

What I claim as my invention, and desire to secure by Letters Patent, is—

1. The bed-piece B, when made with sunk panel and raised edge, substantially as shown and described, and for the purpose set forth.

2. The pan C, when made with the opening having chamfered edges, in combination with the bed-piece B.

ALBERT D. RICHARDS

Witnesses:
WILLIAM EDSON,
A. HUN BERRY.